(12) United States Patent
Hayashi

(10) Patent No.: US 10,848,698 B2
(45) Date of Patent: Nov. 24, 2020

(54) IMAGE CAPTURING APPARATUS AND CONTROL METHOD THEREOF

(71) Applicant: CANON KABUSHIKI KAISHA, Tokyo (JP)

(72) Inventor: Soichiro Hayashi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/574,455

(22) Filed: Sep. 18, 2019

(65) Prior Publication Data

US 2020/0106977 A1 Apr. 2, 2020

(30) Foreign Application Priority Data

Sep. 28, 2018 (JP) ................................ 2018-184989

(51) Int. Cl.
| H04N 5/225 | (2006.01) |
| H04N 5/369 | (2011.01) |
| H04N 5/361 | (2011.01) |
| G02B 7/00  | (2006.01) |

(52) U.S. Cl.
CPC ......... H04N 5/36963 (2018.08); G02B 7/008 (2013.01); H04N 5/361 (2013.01)

(58) Field of Classification Search
CPC ............. H04N 1/00814; H04N 1/6091; H04N 1/4005; H04N 1/215; H04N 5/361; G01J 2001/444
USPC ........................................................ 348/244
See application file for complete search history.

(56) References Cited

U.S. PATENT DOCUMENTS

| 6,982,757 | B2 * | 1/2006 | Tariki ................... | H04N 5/2176 348/222.1 |
| 9,325,911 | B2 | 4/2016 | Negishi | |
| 2003/0128285 | A1 * | 7/2003 | Itoh ........................ | H04N 5/361 348/246 |
| 2004/0095487 | A1 * | 5/2004 | Sato ....................... | H04N 5/361 348/243 |
| 2005/0083419 | A1 * | 4/2005 | Honda ................. | H04N 5/2353 348/244 |
| 2005/0253934 | A1 * | 11/2005 | Yamagishi ......... | H04N 5/23212 348/222.1 |
| 2006/0082675 | A1 * | 4/2006 | McGarvey ............. | H04N 5/361 348/362 |
| 2015/0042849 | A1 | 2/2015 | Negishi | |

FOREIGN PATENT DOCUMENTS

JP 2015-035717 A 2/2015

* cited by examiner

Primary Examiner — Twyler L Haskins
Assistant Examiner — Dwight Alex C Tejano
(74) Attorney, Agent, or Firm — Venable LLP

(57) ABSTRACT

An image capturing apparatus comprises: an image sensor; a light shielding member; a thermometer that measures temperature of the image sensor; and a controller that controls the image sensor so as to perform continuous shooting to obtain a plurality of images. The controller determines a number of images to be shot in the continuous shooting, determines, before starting the continuous shooting, whether or not to shoot a black image with the image sensor being shielded from light by the light shielding member based on the temperature measured by the thermometer and the determined number of images to be shot, and in a case where it is determined to shoot a black image, controls to shoot a black image every time an image is shot in the continuous shooting.

12 Claims, 5 Drawing Sheets

FIG. 3

```
START
  ↓
OBTAIN SET VALUE OF STEP WIDTH — S101
  ↓
OBTAIN CURRENT POSITION OF FOCUS LENS — S102
  ↓
OBTAIN NUMBER OF DRIVING STEPS FROM CURRENT POSITION TO INFINITY POSITION OF FOCUS — S103
  ↓
DETERMINE NUMBER OF SHOTS IN FOCUS BRACKET SHOOTING — S104
  ↓
ACQUIRE TEMPERATURE OF IMAGE SENSOR — S105
  ↓
PREDICT CHANGE IN TEMPERATURE DURING FOCUS BRACKET SHOOTING — S106
  ↓
<S108> DARK CURRENT REMOVAL NEEDED?
  NO → FOCUS BRACKET SHOOTING WITHOUT DARK CURRENT REMOVAL (S109)
  YES → FOCUS BRACKET SHOOTING WITH DARK CURRENT REMOVAL (S110)
  ↓
END
```

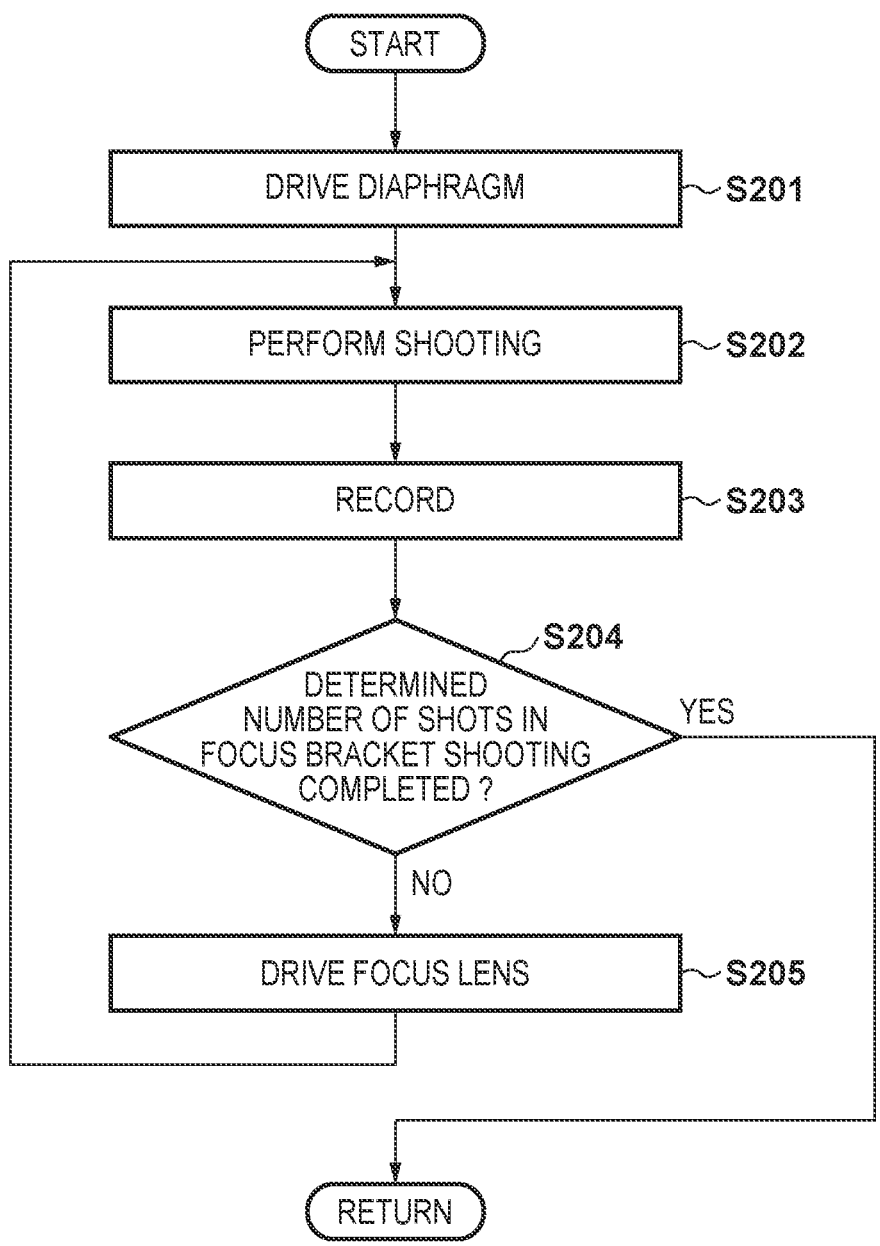

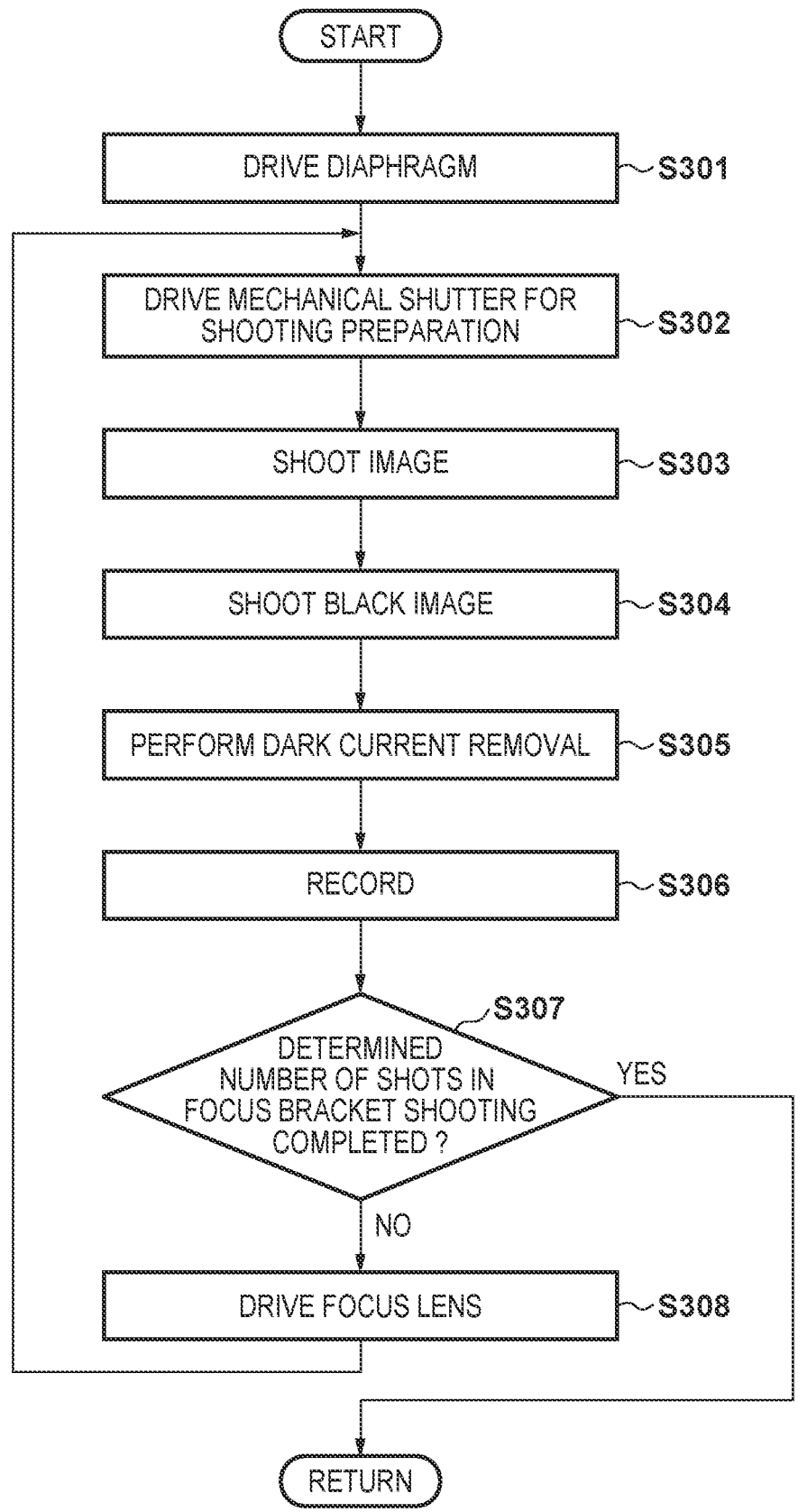

IMAGE CAPTURING APPARATUS AND CONTROL METHOD THEREOF

BACKGROUND OF THE INVENTION

Field of the Invention

The present invention relates to an image capturing apparatus and control method thereof.

Description of the Related Art

In recent years, imaging devices using image sensors such as home video cameras and digital still cameras have been commonly used. Image signals obtained from image sensors used in these imaging devices usually include noise components called dark current which is inherent to the imaging sensors. In particular, in high-sensitivity shooting, slow-shutter shooting, and shooting under high-temperature, image quality may be deteriorated due to the influence of dark current. As a countermeasure for this, there is a technology called dark current removal that removes the noise component by accumulating a charge for the same time period as normal shooting with the image sensor shielded from light, taking a black image, and subtracting the black image from a normal image.

However, in order to perform the dark current removal, it is necessary to perform light-shielded image shooting with the same charge accumulation period as that for normal image shooting each time performing image shooting, and there is a problem that the image shooting interval becomes long when performing continuous shooting. In addition, since it is necessary to shield the image sensor from light in order to take a black image to be used for the dark current removal, it is necessary to drive a mechanical shutter. Accordingly, a method of determining whether it is necessary to perform the dark current removal in consideration of ISO sensitivity, charge accumulation period, temperature of the image sensor, and so on, for each image shooting, and taking the black image only under the condition that the dark current removal is necessary. In this method, when performing continuous shooting of a plurality of images, the temperature of the image sensor rises as shooting is repeated, and it may become necessary to perform the dark current removal in the middle of the continuous shooting. Here, when creating a single composite image from a plurality of images (continuously captured images) obtained by continuous shooting, if the dark current removal is performed only on a part of the continuously captured images, the noise levels of the images to be combined become different, resulting in unevenness of the noise level in the combined image.

On the other hand, the following method is proposed in Japanese Patent Laid-Open No. 2015-35717. That is, when acquiring and synthesizing continuously shot images, the image sensor is shielded from light to capture a black image before shooting the first image and after shooting the last image, but no black image is captured during the continuous shooting. Then, when combining the images, noise components are removed using the two black images.

However, when it is desired to record not only the composite image but also each continuously shot image, it is necessary to perform the dark current removal on each continuously shot image, and the method proposed in Japanese Patent Laid-Open No. 2015-35717 exhibits the following problems. That is, except for the first image and the last image, the interval between the shooting time of the continuously shoot image and the shooting time of the black image is long, and the accuracy of the dark current removal of each continuously shoot image except for the first image and last image decrease.

SUMMARY OF THE INVENTION

The present invention has been made in consideration of the above situation, and prevents images in which dark current removal can be performed and images in which dark current removal cannot be performed from being mixed in continuous shooting.

According to the present invention, provided is an image capturing apparatus comprising: an image sensor; a light shielding member; a thermometer that measures temperature of the image sensor; and a controller that controls the image sensor so as to perform continuous shooting to shoot a plurality of images, wherein the controller determines a number of images to be shot in the continuous shooting, determines, before starting the continuous shooting, whether or not to shoot a black image with the image sensor being shielded from light by the light shielding member based on the temperature measured by the thermometer and the determined number of images to be shot, and in a case where it is determined to shoot a black image, controls to shoot a black image every time an image is shot in the continuous shooting.

Further, according to the present invention, provided is a control method of an image capturing apparatus in a case where continuous shooting is performed using an image sensor, comprising: obtaining temperature of the image sensor; determining a number of images to be shot in the continuous shooting; before starting the continuous shooting, determining whether or not to shoot a black image with the image sensor being shielded from light by a light shielding member based on the temperature and the determined number of images to be shot; in a case where it is determined not to shoot a black image, controlling to continuously shoot images by the number of images by exposing the image sensor; and in a case where it is determined to shoot a black image, controlling to continuously shoot images by the number of images by exposing the image sensor and shoot a black image every time each of the images is shot.

Furthermore, according to the present invention, provided is a non-transitory storage medium readable by a computer, the storage medium storing a program that is executable by the computer, wherein the program includes program code for causing the computer to perform a control method of an image capturing apparatus in a case where continuous shooting is performed using an image sensor, the method comprising: obtaining temperature of the image sensor; determining a number of images to be shot in the continuous shooting; before starting the continuous shooting, determining whether or not to shoot a black image with the image sensor being shielded from light by a light shielding member based on the temperature and the determined number of images to be shot; in a case where it is determined not to shoot a black image, controlling to continuously shoot images by the number of images by exposing the image sensor; and in a case where it is determined to shoot a black image, controlling to continuously shoot images by the number of images by exposing the image sensor and shoot a black image every time each of the images is shot.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a flowchart showing focus bracket shooting control according to the embodiment;

FIG. 4 is a flowchart of a focus bracket shooting operation without shooting for dark current removal according to the embodiment; and FIG. 5 is a flowchart of a focus bracket shooting operation with shooting for dark current removal according to the embodiment.

DESCRIPTION OF THE EMBODIMENTS

Exemplary embodiments of the present invention will be described in detail in accordance with the accompanying drawings. Although the embodiments exhibit concrete and specific configurations to facilitate understanding and explanation of the invention, the present invention is not limited thereto. For example, in the present embodiments, the present invention is applied to a lens-interchangeable digital camera. However, the present invention is also applicable to a digital camera of a non-lens-interchangeable type and a video camera. Further, the present invention may also be implemented in any electronic device equipped with a camera, such as a mobile phone, a personal computer (laptop, tablet, desktop, etc.), a gaming device, and so forth.

Figure 1A:
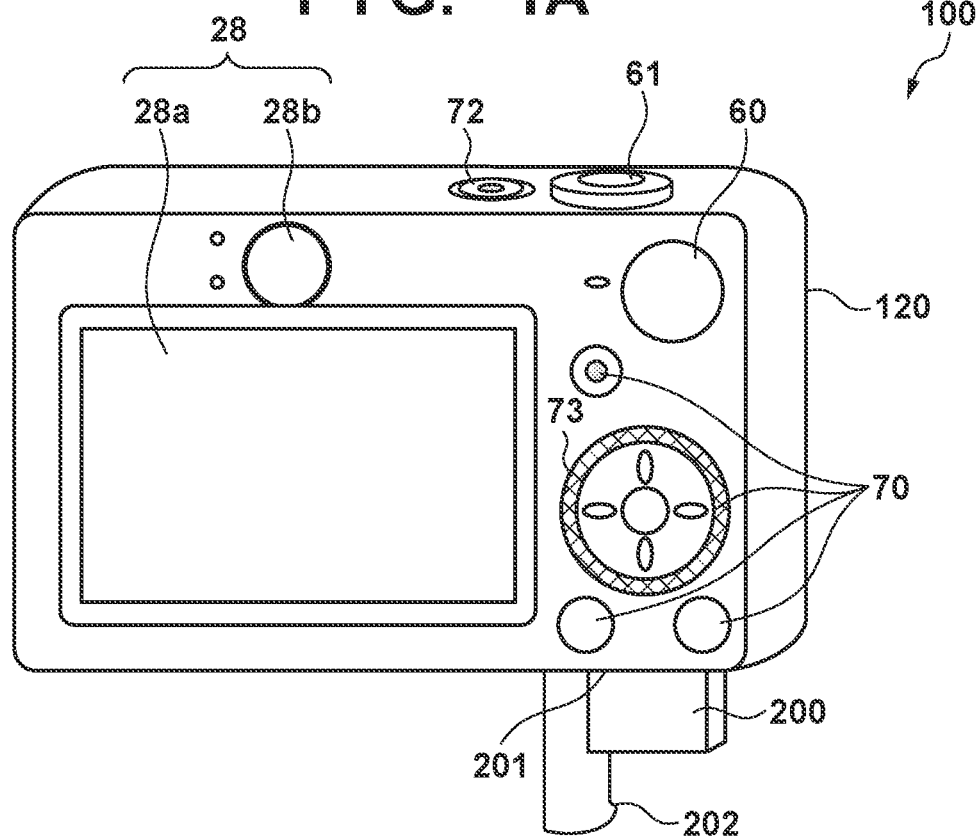
FIGS. 1A and 1B are external views of a digital camera according to an embodiment of the present invention.
Figure 1B:
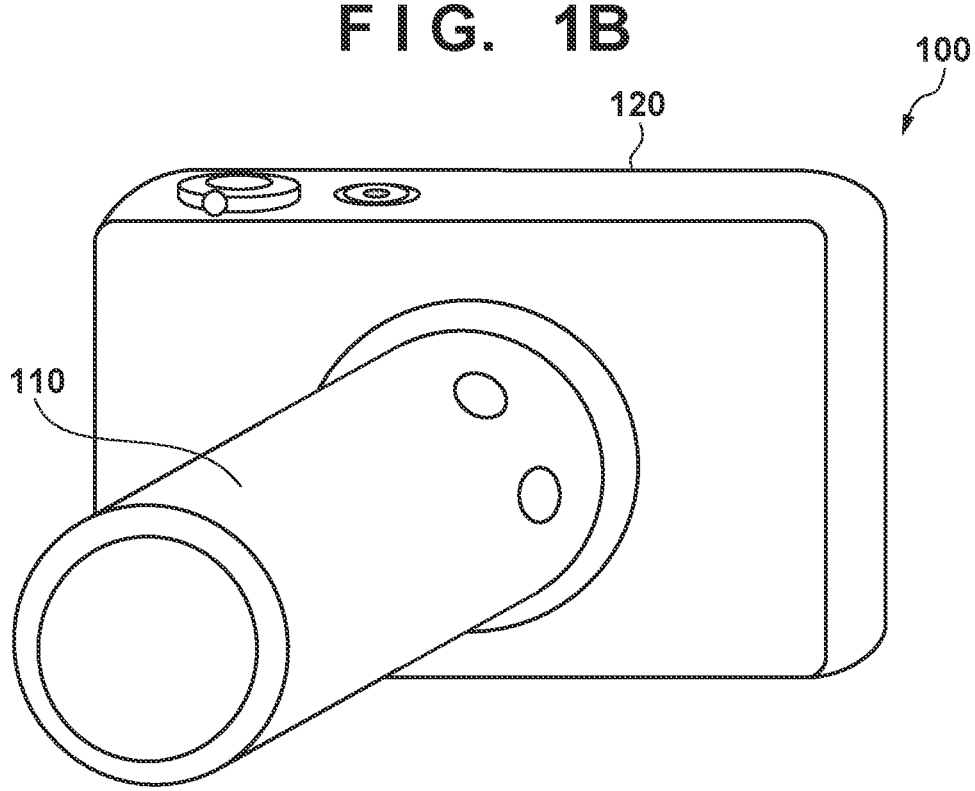

FIGS. 1A and 1B show an external view of a digital camera 100 as an example of an image capturing apparatus in the present embodiment, FIG. 1A shows a back of the digital camera 100, and FIG. 1B shows a front of the digital camera 100. In FIG. 1A, a display 28 includes a rear display panel 28a and an electronic viewfinder 28b which is a display in a finder, and displays images and various information. On the back of the digital camera 100, a plurality of operation members are disposed. The operation members include a shutter button 61 for instructing image shooting, a mode changeover switch 60 for switching various modes, various operation buttons 70 for receiving various operations from a user, a controller wheel 73 capable of rotational operation, and the like. A touch panel may be used as the operation member. A power switch 72 is a push button for switching between power on/off.

A recording medium 200 is a recording medium such as a memory card, a hard disk, and the like, and a recording medium slot 201 is a slot for storing the recording medium 200. The recording medium 200 stored in the recording medium slot 201 can communicate with the digital camera 100, and recording and reproduction become possible. A lid 202 is a lid of the recording medium slot 201. FIG. 1A shows a state in which the lid 202 is opened and a part of the recording medium 200 is taken out from the slot 201 and exposed.

The digital camera 100 of the present embodiment is a lens-interchangeable single lens non-reflex camera, and as shown in FIG. 1B, a lens unit 110 can be attached to a camera body 120 via a mount.

(Description of Configuration of Image Capturing Apparatus—Lens Unit)

Figure 2:
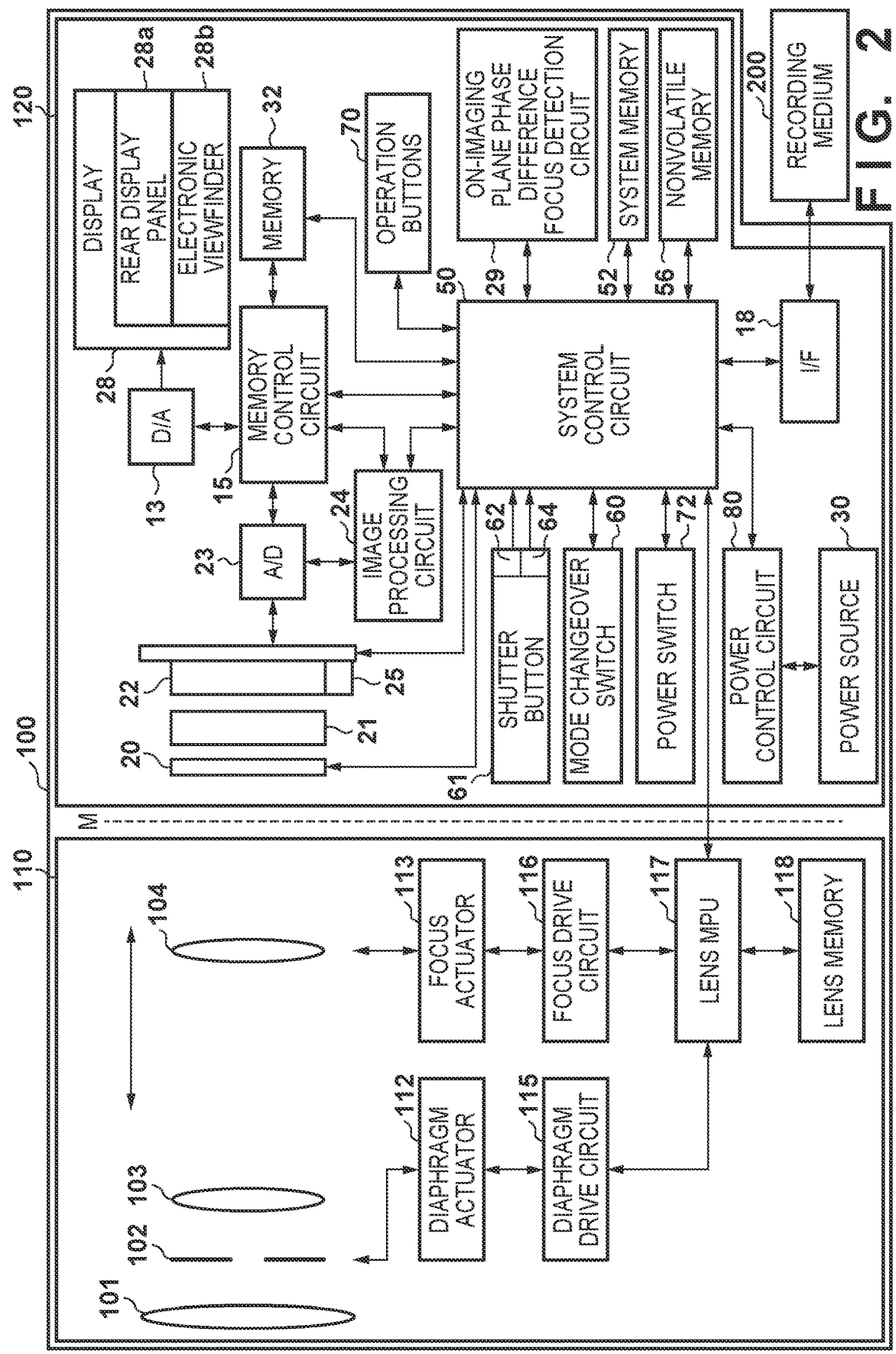
FIG. 2 is a block diagram showing a functional configuration of the digital camera according to the embodiment.

FIG. 2 is a block diagram showing a functional configuration of the digital camera 100 shown in FIGS. 1A and 1B according to the present embodiment. As described above, the digital camera 100 is lens-interchangeable and has a lens unit 110 and a camera body 120. The lens unit 110 is mounted to the camera body 120 via a mount M shown by the dotted line in the center of FIG. 2. In FIG. 2, the same components as those shown in FIGS. 1A and 1B are denoted by the same reference numerals, and the description thereof will be appropriately omitted.

The lens unit 110 has an optical system including a first lens group 101, a diaphragm 102, a second lens group 103, and a focus lens group (hereinafter simply referred to as "focus lens") 104, and a drive/control system, and an optical image of a subject is formed through the optical system.

The first lens group 101 is disposed at the tip of the lens unit 110 on the object side, and is held so as to be movable in the optical axis direction OA. The diaphragm 102 has a function of adjusting a light amount at the time of shooting. The focus lens 104 is movable in the optical axis direction OA, and the subject distance (in-focus distance) at which the lens unit 110 is focused changes in accordance with its position. By controlling the position of the focus lens 104 in the optical axis direction OA, focus control of adjusting the in-focus distance of the lens unit 110 can be performed.

The drive/control system includes a diaphragm actuator 112, a focus actuator 113, a diaphragm drive circuit 115, a focus drive circuit 116, a lens MPU (processor) 117, and a lens memory 118. The diaphragm drive circuit 115 drives the diaphragm 102 using the diaphragm actuator 112 to control the aperture diameter of the diaphragm 102. The focus drive circuit 116 drives the focus lens 104 in the optical axis direction OA using the focus actuator 113 to control the in-focus distance of the optical system of the lens unit 110. Also, the focus drive circuit 116 detects the current position of the focus lens 104 using the focus actuator 113.

The lens MPU 117 performs all operations and controls related to the lens unit 110 and controls the diaphragm drive circuit 115 and the focus drive circuit 116. The lens MPU 117 is connected to a system control circuit 50 of the camera body 120 via the mount M to communicate commands and data. For example, the lens MPU 117 detects the position of the focus lens 104, and notifies the system control circuit 50 of lens position information in response to a request from the system control circuit 50. This lens position information includes the position of the focus lens 104 in the optical axis direction OA, the position in the optical axis direction OA and diameter of the exit pupil when the optical system is not moving, and the position in the optical axis direction OA and diameter of a lens frame that limits the light flux of the exit pupil. Further, the lens MPU 117 controls the diaphragm drive circuit 115 and the focus drive circuit 116 in response to a request from the system control circuit 50.

Optical information necessary for automatic focus detection is stored in advance in the lens memory 118. Also, at the time of shipment from a factory, a focus position (infinity position of focus) of the focus lens 104 at which infinity is in focus is stored in the lens memory 118. The system control circuit 50 controls the operation of the lens unit 110 by executing a program stored in, for example, a built-in non-volatile memory or the lens memory 118.

(Description of Configuration of Image Capturing Apparatus—Camera Body)

The camera body 120 has an optical system including an optical low pass filter 21 and an image sensor 22, and a drive/control system. The first lens group 101, the diaphragm 102, the second lens group 103 and the focus lens 104 of the lens unit 110, and a shutter 20 and an optical low pass filter 21 of the camera body 120 constitute an imaging optical system.

The shutter 20 is a shutter mechanism having shutter curtains corresponding to a focal plane type front/rear curtains used in a so-called single lens non-reflex camera. The shutter 20 controls the exposure time of an optical image that has passed through the first lens group 101, the diaphragm 102, and the second lens group 103 of the lens unit 110 and shields light under control of the system control circuit 50. The optical low pass filter 21 reduces false color and moiré of a captured image.

The image sensor 22 is typically a CMOS image sensor or a CCD image sensor, composed of a photoelectric conversion unit and a peripheral circuit, and has m pixels in the horizontal direction and n pixels in the vertical direction (n and m are 2 or more integers). The image sensor 22 is controlled by the system control circuit 50, and in addition to controlling the exposure period using the shutter 20, the exposure period may be controlled using an electronic shutter by controlling a charge accumulation period by controlling the reset timing of the image sensor 22. In addition, at least a part of the pixels of the image sensor 22 has a pupil division function, and an on-imaging plane phase difference focus detection circuit 29 performs phase difference AF using a pair of image data output from those pixels.

An analog signal output from the image sensor 22 is converted into a digital signal by an A/D converter 23, and is written to a memory 32 via an image processing circuit 24 and a memory control circuit 15 or directly via the memory control circuit 15.

The image processing circuit 24 generates data for phase difference AF and image data for display and recording from the signal output from the A/D converter 23. Further, the image processing circuit 24 performs resizing processing, such as predetermined pixel interpolation and reduction, and color conversion processing on the generated image data or the image data from the memory control circuit 15. Further, the image processing circuit 24 performs predetermined arithmetic processing using a signal from the A/D converter 23. The system control circuit 50 can perform TTL (through-the-lens) AF (auto focus) processing, AE (auto exposure) processing, and EF (flash pre-emission) processing based on the obtained calculation result. The image processing circuit 24 further performs predetermined arithmetic processing using the signal output from the A/D converter 23, and also performs TTL AWB (auto white balance) processing based on the obtained arithmetic result.

A thermistor 25 is disposed near the image sensor 22 to measure the temperature of the image sensor 22, and notifies the system control circuit 50 of temperature information.

The memory 32 stores digital signals obtained by the image sensor 22 and converted by the A/D converter 23, and image data to be displayed on the display 28. The memory 32 has a storage capacity sufficient to store a predetermined number of still images, and moving images and sounds for a predetermined time.

The memory 32 also serves as a memory (video memory) for image display. A D/A converter 13 converts the digital image data for display stored in the memory 32 into an analog signal and supplies the analog signal to the display 28. The display image data written to the memory 32 is thus displayed on the display 28 via the D/A converter 13. The display 28 performs display according to the analog signal from the D/A converter 13 on a display screen such as an LCD. A through image display (live view display) can be performed by converting the digital image signal once A/D converted by the A/D converter 23 and stored in the memory 32 into an analog signal in the D/A converter 13 and sequentially transferring the analog signal to the display 28.

A non-volatile memory 56 is a memory as an electrically erasable/recordable recording medium and, for example, an EEPROM or the like is used. In the non-volatile memory 56, constants, programs and the like for the operation of the system control circuit 50 are stored. Note that the programs referred to here is a computer program for executing various flowcharts described later in the present embodiment.

The system control circuit 50 controls the entire digital camera 100. The system control circuit 50 is connected to the lens MPU 117 via a signal line of the mount M, and communicates commands and data with the lens MPU 117. Then, the system control circuit 50 issues, to the lens MPU 117, a request for acquiring the lens position, commands for driving the diaphragm 102 and the focus lens 104 with predetermined driving amounts, and a request for acquiring optical information unique to the lens unit 110. Further, the system control circuit 50 implements each process of the present embodiment described later by executing the program recorded in the non-volatile memory 56. A RAM is used as a system memory 52, and constants and variables for operation of the system control circuit 50, programs read from the non-volatile memory 56, and the like are expanded there. The system control circuit 50 also performs display control by controlling the memory 32, the D/A converter 13, the display 28, and the like.

The mode changeover switch 60 switches the operation mode of the system control circuit 50 to any one of a still image recording mode, a moving image shooting mode, a playback mode, and the like. The still image recording mode includes an auto shooting mode, an auto scene determination mode, a manual mode, various scene modes with shooting settings for respective shooting scenes, a program AE mode, a custom mode, and the like. The mode changeover switch 60 allows direct switching to any of these modes contained in a menu list. Alternatively, after switching to the menu list by the mode changeover switch 60, the other operation member may be used to switch to any of these modes included in the menu list. Similarly, a plurality of modes may be included in the moving image shooting mode.

A first shutter switch 62 is turned on in the middle of operation of the shutter button 61 which is so-called half depression (shooting preparation instruction), and a first shutter switch signal SW1 is generated. The first shutter switch signal SW1 causes to start operations such as AF (Auto Focus) processing, AE (Auto Exposure) processing, AWB (Auto White Balance) processing, and the like. A second shutter switch 64 is turned on by completion of the operation of the shutter button 61, which is so-called full depression (shooting instruction), and a second shutter switch signal SW2 is generated. In response to the generation of the second shutter switch signal SW2, the system control circuit 50 starts a series of operations of shooting processing from reading out signals from the image sensor 22 to writing of image data to the recording medium 200.

The operation buttons 70 and the controller wheel 73 are assigned functions appropriately for each scene, for example, in order to select and operate various function icons displayed on the display 28, and function as various function buttons. The function buttons include, for example, an end button, a back button, an image feed button, a jump button, a narrowing button, and an attribute change button. For example, when the menu button is pressed, various settable menu lists are displayed on the display 28. The user can intuitively perform various settings using the menu lists displayed on the display 28, and the four-direction (up, down, left, and right) button and the SET button. Also, for example, when the live view button is pressed, display/non-display on the display 28 of the image acquired by the image sensor 22 can be switched.

A controller wheel 73 shown in FIG. 1A is a rotatable operation member, and is used together with the direction button to designate a selection item. When the controller wheel 73 is rotated, an electrical pulse signal is generated according to the amount of operation, and the system control circuit 50 controls each part of the digital camera 100 based on the pulse signal. Based on this pulse signal, it is possible to determine the angle at which the controller wheel 73 is rotated, the number of rotations, and the like. The controller wheel 73 may be any operation member as long as a rotation operation can be detected. For example, the controller wheel 73 may be a dial operation member that rotates to generate a pulse signal according to the user's rotation operation. Alternatively, the controller wheel 73 may be an operation member composed of a touch sensor, the controller wheel 73 does not rotate itself, and the rotation of the user's finger on the controller wheel 73 (so-called touch wheel) is detected.

A power control circuit 80 includes a battery detection circuit, a DC-DC converter, a switch circuit for switching a block to be energized, and the like, and detects the presence or absence of a battery, the type of battery, and a remaining amount of battery. Further, the power control circuit 80 controls the DC-DC converter based on the detection result and the instruction from the system control circuit 50, and supplies the necessary voltage to each part including the recording medium 200 for a necessary period. A power source 30 may be a primary battery such as an alkaline battery or a lithium battery, a secondary battery such as a NiCd battery, a NiMH battery, a Li battery or the like, an AC adapter, or the like.

A recording medium I/F 18 is an interface with the recording medium 200. The recording medium 200 is composed of a semiconductor memory, an optical disk, a magnetic disk, etc., and records a shot image.

The on-imaging plane phase difference focus detection circuit 29 performs phase difference focus detection processing using the focus detection data obtained by the image processing circuit 24. More specifically, the image processing circuit 24 generates a pair of focus detection data from signals obtained by converting a light flux passed through a pair of pupil regions of the imaging optical system by the pixels having the pupil division function of the image sensor 22. Then, the on-imaging plane phase difference focus detection circuit 29 detects the defocus amount (focus evaluation value) based on the shift amount of the pair of focus detection data. In this manner, the on-imaging plane phase difference focus detection circuit 29 of this embodiment can perform phase difference AF (on-imaging plane phase difference AF) based on the output of the image sensor 22 without using an AF sensor dedicated to focus detection. Since the on-imaging plane phase difference AF is a well-known technique, detailed description is omitted here. The system control circuit 50 acquires the focus evaluation value acquired by the on-imaging plane phase difference focus detection circuit 29, and, via the lens MPU 117, controls to move the focus lens 104 in a predetermined direction along the optical axis direction OA by a predetermined amount.

(Explanation of Operation)

Next, the operation of this embodiment will be described with reference to FIGS. 3 to 5. FIG. 3 is a flowchart showing focus bracket shooting control of the digital camera 100 in the present embodiment. The processing of this flowchart is performed by the system control circuit 50 executing a program stored in the non-volatile memory 56 in response to the second shutter switch 64 being turned on by the operation of the shutter button 61 while the power is on.

The digital camera 100 stores settings related to shooting (hereinafter referred to as "shooting settings") in the system memory 52, and the user can arbitrarily set the shooting settings in advance by operating the operation buttons 70 and controller wheel 73. Shooting settings for focus bracket shooting include a setting indicating whether or not to execute focus bracket shooting, the number of shots in focus bracket shooting, and a step width of a focus position in focus bracket shooting. In the following description, it is assumed that "execute" is selected as a setting indicating whether or not to execute focus bracket shooting.

In addition, before focus bracket shooting starts, the focus lens 104 moves near the in-focus position by autofocus using the on-imaging plane phase difference focus detection circuit 29 or by manual focus in which the user operates lens unit 110 manually. A plurality of images obtained by focus bracket shooting can be synthesized by, for example, the image processing circuit 24 or an external computer using an application, whereby a synthesized image with an expanded depth of field can be obtained. Please note that the present invention is not limited by the usage of the plurality of images obtained by shooting.

When the second shutter switch signal SW2 becomes on, in step S101, the system control circuit 50 reads out the setting value of the step width for the focus bracket shooting from the system memory 52. The setting value of the step width is a discrete value, and when the setting is made by the user, the value is obtained, and when the setting is not made by the user, the default value is obtained. Then, the obtained value is converted into the number of driving steps for driving the focus lens 104 according to the focal length of the mounted lens.

Next, in step S102, the system control circuit 50 communicates with the lens MPU 117 to obtain the current position of the focus lens 104 (hereinafter referred to as "current position"). Here, it is assumed that the current position of the focus lens 104 is represented by the number of driving steps with the closest end position as a reference.

Next, in step S103, the system control circuit 50 communicates with the lens MPU 117 to acquire the infinity position of focus stored in the lens memory 118. The infinity position of focus is also represented by the number of driving steps with the closest end position as the reference. Then, from the difference between the acquired infinity position of focus and the current position acquired in step S102, the number of driving steps from the current position to the infinity position of focus is obtained.

In step S104, the number of shots to be performed in the focus bracket shooting is determined. The number of shots in the focus bracket shooting indicates the possible number of shots that can be performed while moving the focus lens 104 by a driving amount corresponding to the set value of the step width for each shot from the current position until the infinity position is reached. The possible number of shots can be obtained by dividing the number of driving steps from the current position to the infinity position of focus obtained in step S103 by the number of driving steps corresponding to the set value of the step width obtained in step S101. Alternatively, if the number of shots in the focus bracket shooting is set by the user, that value is used. However, if the calculated possible number of shots is smaller than the number of shots set by the user, the calculated possible number of shots is determined as the number of shots in the focus bracket shooting even if the number of shots in focus bracket shooting is set by the user.

In step S105, the system control circuit 50 obtains the temperature of the image sensor 22 from the thermistor 25. In step S106, the system control circuit 50 predicts how the temperature of the image sensor 22 changes in each shot of focus bracket shooting. During continuous shooting, the temperature of the image sensor 22 rises with each shooting, and information on how the temperature of the image sensor 22 changes during continuous shooting is stored in advance in the non-volatile memory 56. Therefore, the temperature of the image sensor 22 at each shooting can be predicted from the current temperature information of the image sensor 22 acquired in step S105 and the number of shots determined in step S104. Note that the temperature change information stored in the non-volatile memory 56 may be table data indicating the relationship between the temperature of the image sensor 22 and the number of shots, or expressed as a function with the temperature of the image sensor 22 and the number of shots as variables.

Then, in step S108, based on the temperature change of the image sensor 22 predicted in step S106, it is determined whether or not the temperature at which dark current removal is required will be reached during focus bracket shooting. The noise component of the output of the image sensor 22 is affected by the temperature, and the noise component increases as the temperature rises. Therefore, as noise removal processing is required when the temperature of the image sensor 22 is predicted to exceed a certain temperature during focus bracket shooting, it is determined that dark current removal is necessary.

If it is determined that the dark current removal is not necessary, the process advances to step S109 to perform focus bracket shooting in which dark current removal is not performed in each shot. The details of the process in step S109 will be described later with reference to FIG. 4. On the other hand, if it is determined that dark current removal is necessary, the process proceeds to step S110, and focus bracket shooting accompanied by dark current removal in each shot is performed. The details of the process in step S110 will be described later with reference to FIG. 5.

When the focus bracket shooting is finished in step S109 or S110, the shooting processing of FIG. 3 is finished.

FIG. 4 is a flow chart showing the focus bracket shooting procedure, in which dark current removal is not performed in each shot, performed in step S109 by the digital camera 100 of the present embodiment.

In step S201, the system control circuit 50 performs AE processing to determine the aperture amount, and communicates with the lens MPU 117 to notify the determined aperture amount. The lens MPU 117 controls the diaphragm drive circuit 115 when notified of the aperture amount, and controls the diaphragm 102 to a desired aperture amount by driving the diaphragm actuator 112.

In step S202, the system control circuit 50 controls the image sensor 22 to start exposure. The exposure period at this time is controlled by an electronic shutter. As a disadvantage of the electronic shutter compared with the mechanical shutter, there is rolling shutter distortion in which, when a moving subject is shot, the subject is distorted between the upper and lower portions of the captured image. However, in focus bracket shooting, this disadvantage is reduced because the subject is assumed to be stationary. On the other hand, as a merit of the electronic shutter compared with the mechanical shutter, there is no need to drive the mechanical shutter 20, and the durability of the mechanical shutter 20 is not affected, so the electronic shutter is adopted in this shooting. When the exposure period has elapsed, signals are read out from the image sensor 22, and the digital signals which are A/D converted by the A/D converter 23 are input to the image processing circuit 24.

In step S203, the image data processed by the image processing circuit 24 is recorded on the recording medium 200 through the I/F 18. After that, in step S204, it is determined whether or not the number of shots in the focus bracket shooting determined in step S104 has been completed, and if it has been completed, the shooting is ended. On the other hand, if the number of shots in the focus bracket shooting determined in step S104 is not completed, the process proceeds to step S205.

In step S205, the focus lens 104 is driven for the next shooting. Here, the system control circuit 50 issues a focus drive instruction to the lens MPU 117 together with the number of driving steps acquired in step S101. The lens MPU 117 controls the focus drive circuit 116 based on the notified number of driving steps, and moves the focus lens 104 toward the infinity side by the number of driving steps through the focus actuator 113. When the effective f-number changes by moving the focus lens 104, the diaphragm 102 may be controlled to compensate for the change. After moving the focus lens 104, the process returns to step S202, and shooting is repeated.

FIG. 5 is a flow chart showing the focus bracket shooting procedure accompanied by dark current removal performed in step S110 by the digital camera 100 of the present embodiment.

In step S301, the system control circuit 50 performs AE processing to determine the aperture amount, and communicates with the lens MPU 117 to notify the determined aperture amount. The lens MPU 117 controls the diaphragm drive circuit 115 when notified of the aperture amount, and controls the diaphragm 102 to a desired aperture amount by driving the diaphragm actuator 112.

Next, in step S302, the shooting preparation drive of the mechanical shutter 20 is performed. The content of the shooting preparation drive differs depending on the state of the mechanical shutter 20, but the purpose is to place the mechanical shutter 20 in a state in which shutter travel is possible in order to control the exposure time at a desired timing in a later step.

In step S303, the system control circuit 50 controls the image sensor 22 to start exposure. At this time, the mechanical shutter 20 is simultaneously controlled to control the exposure period. In this shooting, the image sensor 22 has to be shielded from light in order to shoot a black image for dark current removal after shooting a normal image, so the mechanical shutter 20 is also used when shooting a normal image. When the exposure time has elapsed, the image signals are read out from the image sensor 22, and the digital image signals which are A/D converted by the A/D converter 23 are held in the memory 32 via the image processing circuit 24.

Next, in step S304, the system control circuit 50 controls the image sensor 22 to start taking a black image for dark current removal. At this time, the mechanical shutter 20 is in a state where the traveling of both the front and rear curtains is completed in step S303, and the image sensor 22 is shielded from light. In addition, the setting of the charge accumulation period and the sensitivity at the time of shooting a black image is the same as those at the time of shooting a normal image in step S303.

In step S305, the image processing circuit 24 performs dark current removal that subtracts the black image obtained in step S304 from the image obtained in step S303, and obtains an image from which noise has been removed.

In step S306, the shot image subjected to dark current removal is recorded on the recording medium 200 through the I/F 18. Thereafter, in step S307, it is determined whether or not the number of shots in the focus bracket shooting determined in step S104 has been completed. If completed, the shooting is ended. On the other hand, if the number of shots in the focus bracket shooting determined in step S104 is not completed, the process proceeds to step S308.

In step S308, the focus lens 104 is driven for the next shooting. Here, the system control circuit 50 issues a focus drive instruction to the lens MPU 117 together with the number of driving steps acquired in step S101. The lens MPU 117 controls the focus drive circuit 116 based on the notified number of driving steps, and moves the focus lens 104 toward the infinity side by the number of driving steps through the focus actuator 113. When the effective f-number changes by moving the focus lens 104, the diaphragm 102 may be controlled to compensate for the change. After moving the focus lens 104, the process returns to step S302, and shooting is repeated.

In the example described above, the focus bracket shooting is performed while moving the focus lens 104 from the in-focus position to the infinity position, however, the movement range of the focus lens 104 at the time of performing focus bracket shooting is not limited to this. For example, the movement range may be a predetermined range centered on the in-focus position, or a movable range of the focus lens 104.

Further, in the above-described example, the case of performing focus bracket shooting has been described, but the present invention is not limited to the focus bracket shooting and can be applied to continuous shooting. The continuous shooting includes, for example, normal continuous shooting, AE bracketing shooting performed while changing the exposure amount, and panoramic shooting in which shooting is repeatedly performed while changing the angle of view, and combining the shot images.

Also, in the above-described example, the case where dark current removal is performed during performing focus bracket shooting has been described, but the image captured in step S303 and the black image captured in step S304 are stored in association with each other, and dark current removal may be performed later in the image processing circuit 24 or in an external device.

According to the present embodiment as described above, when performing continuous shooting, whether or not dark current removal is necessary is determined before starting the continuous shooting, and if the dark current removal is required, a black image is taken for each shot. On the other hand, if the dark current removal is not required, it is controlled so as not to shoot a black image. In this way, in an image in which the influence of noise due to dark current is predicted to be large, the influence of noise can be suppressed, and images which have undergone dark current removal and images which have not undergone dark current removal are not mixed in a plurality of images obtained in continuous shooting. Therefore, for example, in a case where a composite image is generated using these images, it is possible to suppress the occurrence of noise level gap between the regions in the composite image.

In addition, in a case where the dark current removal is not necessary, since the black image is not taken, it is possible to prevent the time taken for shooting from being extended.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-184989, filed on Sep. 28, 2018 which is hereby incorporated by reference herein in its entirety.

What is claimed is:
1. An image capturing apparatus comprising:
    an image sensor;
    a light shielding member;
    a thermometer that measures temperature of the image sensor; and
    a controller that controls the image sensor so as to perform continuous shooting to shoot a plurality of images,
    wherein the controller
        determines a number of images to be shot in the continuous shooting,
        determines, before starting the continuous shooting, whether or not to shoot a black image with the image sensor being shielded from light by the light shielding member based on the temperature measured by the thermometer and the determined number of images to be shot, and
        in a case where it is determined to shoot a black image, controls to shoot a black image every time an image is shot in the continuous shooting.

2. The image capturing apparatus according to claim 1, wherein the controller predicts temperature of the image sensor at each shooting to be performed in the continuous shooting, and in a case where the predicted temperature reaches a predetermined temperature, the controller determines to shoot a black image.

3. The image capturing apparatus according to claim 2 further comprising a memory that stores information relating to temperature change of the image sensor at a time of continuous shooting,
wherein the controller performs the prediction using the information relating to temperature change stored in the memory.

4. The image capturing apparatus according to claim 3, wherein the information relating to temperature change is table data showing a relationship between temperature of the image sensor and a number of images.

5. The image capturing apparatus according to claim 3, wherein the information relating to temperature change is a function showing a relationship between temperature of the image sensor and a number of images.

6. The image capturing apparatus according to claim 1 further comprising a processor for subtracting a black image that is shot every time an image is shot in the continuous shooting from the shot image.

7. The image capturing apparatus according to claim 1, wherein, in a case where the controller determines to shoot a black image by the image sensor, each image shot in the continuous shooting and a black image shot every time each image is shot are stored in association with each other.

8. The image capturing apparatus according to claim 1, wherein the controller controls to perform the continuous shooting while changing a position of a focus lens.

9. The image capturing apparatus according to claim 1, wherein the controller controls to perform the continuous shooting while changing an exposure amount.

10. The image capturing apparatus according to claim 1, wherein the controller controls to perform the continuous shooting in panoramic shooting in which shooting is performed while changing a shooting direction.

11. A control method of an image capturing apparatus in a case where continuous shooting is performed using an image sensor, comprising:
obtaining temperature of the image sensor;
determining a number of images to be shot in the continuous shooting;
before starting the continuous shooting, determining whether or not to shoot a black image with the image sensor being shielded from light by a light shielding member based on the temperature and the determined number of images to be shot;
in a case where it is determined not to shoot a black image, controlling to continuously shoot images by the number of images by exposing the image sensor; and
in a case where it is determined to shoot a black image, controlling to continuously shoot images by the number of images by exposing the image sensor and shoot a black image every time each of the images is shot.

12. A non-transitory storage medium readable by a computer, the storage medium storing a program that is executable by the computer, wherein the program includes program code for causing the computer to perform a control method of an image capturing apparatus in a case where continuous shooting is performed using an image sensor, the method comprising:
obtaining temperature of the image sensor;
determining a number of images to be shot in the continuous shooting;
before starting the continuous shooting, determining whether or not to shoot a black image with the image sensor being shielded from light by a light shielding member based on the temperature and the determined number of images to be shot;
in a case where it is determined not to shoot a black image, controlling to continuously shoot images by the number of images by exposing the image sensor; and
in a case where it is determined to shoot a black image, controlling to continuously shoot images by the number of images by exposing the image sensor and shoot a black image every time each of the images is shot.

* * * * *